(12) United States Patent
Suzuki et al.

(10) Patent No.: US 9,166,219 B2
(45) Date of Patent: Oct. 20, 2015

(54) ELECTRIC STORAGE DEVICE

(75) Inventors: Isao Suzuki, Kyoto (JP); Takeshi Nakamoto, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 53 days.

(21) Appl. No.: 13/980,560

(22) PCT Filed: Jan. 30, 2012

(86) PCT No.: PCT/JP2012/051978
§ 371 (c)(1),
(2), (4) Date: Jul. 18, 2013

(87) PCT Pub. No.: WO2012/105490
PCT Pub. Date: Aug. 9, 2012

(65) Prior Publication Data
US 2013/0309534 A1    Nov. 21, 2013

(30) Foreign Application Priority Data

Jan. 31, 2011 (JP) .................... 2011-018749

(51) Int. Cl.
| | |
|---|---|
| *H01M 4/00* | (2006.01) |
| *H01M 2/36* | (2006.01) |
| *H01M 2/02* | (2006.01) |
| *H01M 2/04* | (2006.01) |
| *H01M 2/26* | (2006.01) |
| *H01M 2/30* | (2006.01) |
| *H01M 10/04* | (2006.01) |

(52) U.S. Cl.
CPC .............. *H01M 2/36* (2013.01); *H01M 2/0217* (2013.01); *H01M 2/0473* (2013.01); *H01M 2/263* (2013.01); *H01M 2/30* (2013.01); *H01M 10/0431* (2013.01); *H01M 2/361* (2013.01); *H01M 2/362* (2013.01)

(58) Field of Classification Search
CPC ...................................... H01M 2/0217
USPC .................................. 429/162, 163
See application file for complete search history.

(56) References Cited

U.S. PATENT DOCUMENTS

2010/0233528 A1* 9/2010 Kim et al. ............. 429/178
2011/0117402 A1* 5/2011 Kim et al. .............. 429/94

FOREIGN PATENT DOCUMENTS

| JP | 11-025936 A | 1/1999 |
|---|---|---|
| JP | 2002-100329 A | 4/2002 |
| JP | 2004-111300 A | 4/2004 |

(Continued)

OTHER PUBLICATIONS

International Search Report dated May 1, 2012 in PCT/JP2012/051978, with English translation thereof.

*Primary Examiner* — Jane Rhee
(74) *Attorney, Agent, or Firm* — McGinn IP Law Group, PLLC.

(57) ABSTRACT

An electric storage device includes: an external terminal having an exposed face exposed outside from an outer covering; a current collector disposed inside the outer covering and connected to the external terminal; and an electrode assembly disposed inside the outer covering and connected to the current collector. The electrode assembly is formed by winding sheet-shaped positive electrode and negative electrode into a flat shape with a separator interposed therebetween and housed in the outer covering so that curved portions obtained by the winding are positioned on a lid body side and a bottom face side. A lid body has an electrolyte solution filling portion that opens to a clearance formed between the curved portion of the electrode assembly and the outer covering.

18 Claims, 11 Drawing Sheets

(56) References Cited

FOREIGN PATENT DOCUMENTS

| | | |
|---|---|---|
| JP | 2004-164937 A | 6/2004 |
| JP | 2010-135242 A | 6/2010 |
| JP | 2010-176989 A | 8/2010 |
| JP | 2010-212240 A | 9/2010 |
| JP | 2010-282847 A | 12/2010 |

* cited by examiner (a)

(b)

(a)

(b)

(a)

(b)

ELECTRIC STORAGE DEVICE

TECHNICAL FIELD

The present invention relates to an electric storage device.

BACKGROUND ART

Conventionally, there is a sealed battery, disclosed as a battery that is an example of an electric storage device, in which, when a meeting portion between a periphery of a lid body and an opening portion of a battery is sealed, the meeting portion is partially unsealed to form a clearance portion and the clearance portion is sealed after filling electrolyte solution through the clearance portion (see Patent Document 1).

PRIOR ART DOCUMENT

Patent Document

Patent Document 1: JP-A-2002-100329

SUMMARY OF THE INVENTION

Problems to be Solved by the Invention

However, in the case of the above-described prior-art battery, a positional relationship between a filling position and an electrode assembly housed inside is not sufficiently considered in filling the electrolyte solution. In other words, if the electrode assembly is positioned at the filling position, the influent electrolyte solution does not smoothly flow to other areas and energy density is not sufficiently increased. Moreover, it takes extra time to fill the electrolyte solution to decrease electrolyte solution filling efficiency.

Therefore, it is an object of the present invention to provide an electric storage device in which not only electrolyte solution filling efficiency but also energy density is high.

Means for Solving the Problems

According to an aspect of the invention, there is provided, as means for solving the problems, an electric storage device including: an outer covering; an external terminal having an exposed face exposed outside from the outer covering; a current collector disposed inside the outer covering and connected to the external terminal; and an electrode assembly disposed inside the outer covering and connected to the current collector;

wherein the outer covering is substantially in a shape of a rectangular parallelepiped and formed by a lid body forming one face of the outer covering and an electric storage device case forming the other faces;

the electrode assembly is formed by winding sheet-shaped positive electrode and negative electrode into a flat shape with a separator interposed therebetween and housed in the electric storage device case so that curved portions obtained by the winding are positioned on a lid body side and a bottom face side; and the lid body has an electrolyte solution filling portion that opens to a clearance formed between the curved portion of the electrode assembly and the lid body.

A position of the curved portion of the electrode assembly, which protrudes the most toward the lid body, may be in contact with the lid body or in a vicinity of the lid body.

The electrolyte solution filling portion may be a through hole formed in the lid body or a notch formed at an edge portion.

With the above-described structure, even if the electrode assembly is positioned close to the lid body, it is possible to secure a sufficient space (electrolyte solution filling space) at an opening portion of the electrolyte solution filling portion inside the outer covering. Because of the electrolyte solution filling space, the influent electrolyte solution smoothly flows to other portions of the electrode assembly. In this way, it is possible to efficiently fill the electrolyte solution from the electrolyte solution filling portion. Moreover, the electrolyte solution can be sufficiently supplied throughout the entire area of the electrode assembly, which sufficiently increases energy density. Furthermore, because the electrolyte solution filling portion is formed in the lid body, even if the plurality of electric storage devices are arranged side by side, the electrolyte solution filling portions closed after filling of the electrolyte solution do not obstruct the arrangement.

Preferably, the two or more electrode assemblies are housed in the electric storage device case with flat face portions of the electrode assemblies adjacent to each other; and the electrolyte solution filling portion of the lid body is formed to open to the clearance formed between the curved portion of any one of the electrode assemblies and the lid body.

With this structure, the electrolyte solution filling portion can be formed flexibly in a suitable position according to the number of electrode assemblies housed in the outer covering, the electrolyte solution can be filled swiftly, and the energy density can be increased.

Preferably, the lid body is disposed close to the electrode assembly and an area of the lid body where the exposed face of the external terminal is disposed is formed by an engagement receiving portion bulging away from the electrode assembly.

Preferably, the current collector has a connection receiving portion and a leg portion extending from the connection receiving portion; and the connection receiving portion of the current collector can be disposed in the engagement receiving portion of the lid body.

A gasket may be disposed between the engagement receiving portion of the lid body and the connection receiving portion of the current collector.

With the structure in which the engagement receiving portion is formed in the lid body, the electrode assembly can be disposed close to the lid body, an occupied volume for the electrode assembly in the inner space can be increased, and the energy density can be increased.

Preferably, the electrolyte solution filling portion is in a slit shape extending in a width direction of the lid body.

With this structure, the electrolyte solution can be filled from any part of the electrolyte solution filling portion formed in the slit shape and it is possible to fill the electrolyte solution from a suitable position depending on the situation such as different structures. For example, even when the number of electrode assemblies to be housed is changed, it is unnecessary to change the position where the electrolyte solution filling portion is formed.

The electrolyte solution filling portion is closed by welding a plug body to the electrolyte solution filling portion. Because the electrolyte solution filling portion opens to the clearance formed between the curved portion of the electrode assembly and the lid body and the plug body is welded in the position away from the electrode assembly, the electrode assembly is less affected by heat and a short circuit is less liable to occur.

Preferably, a minimum distance between the electrolyte solution filling portion and the electrode assembly is not shorter than 0.5 mm. In this way, it is possible to smoothly carry out electrolyte solution filling operation.

Advantages of the Invention

According to the invention, the position of the electrolyte solution filling portion formed in the lid body is determined in consideration of a form of the electrode assembly housed inside and therefore the electrolyte solution can be filled efficiently and also a state of high energy density can be obtained after filling of the electrolyte solution.

MODES FOR CARRYING OUT THE INVENTION

Embodiments according to the present invention will be described below in accordance with the accompanying drawings. Although terms indicating specific directions and positions (e.g., "upper", "lower", "side", "end" and other phrases including the term) are used if needed in the following description, they are used to facilitate understanding of the invention with reference to the drawings and their meanings do not restrict the technical scope of the invention.

Figure 1:
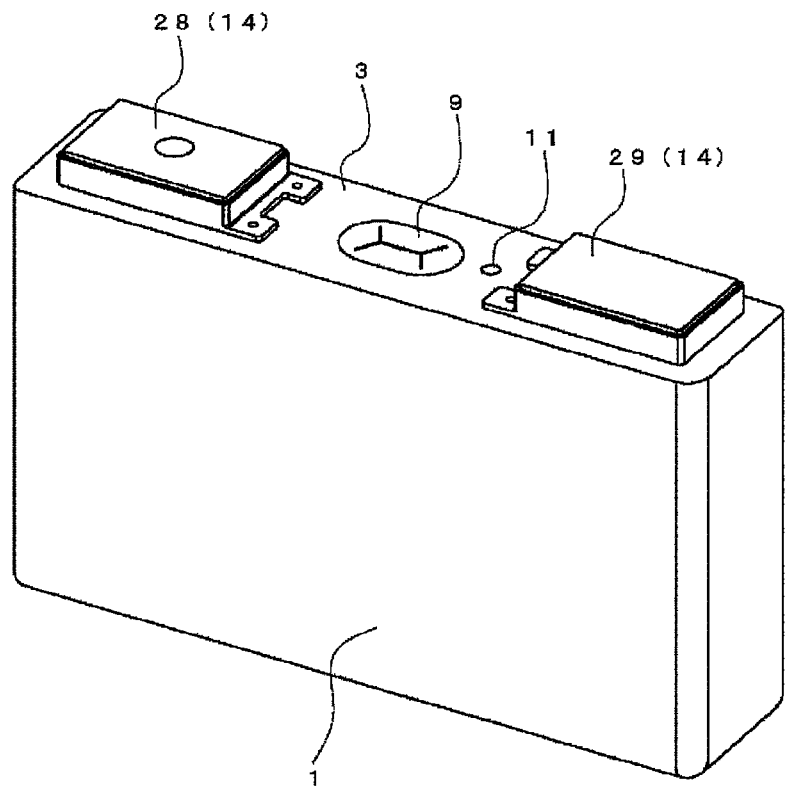
FIG. 1 is a perspective view of a battery according to the present embodiment.
Figure 2:
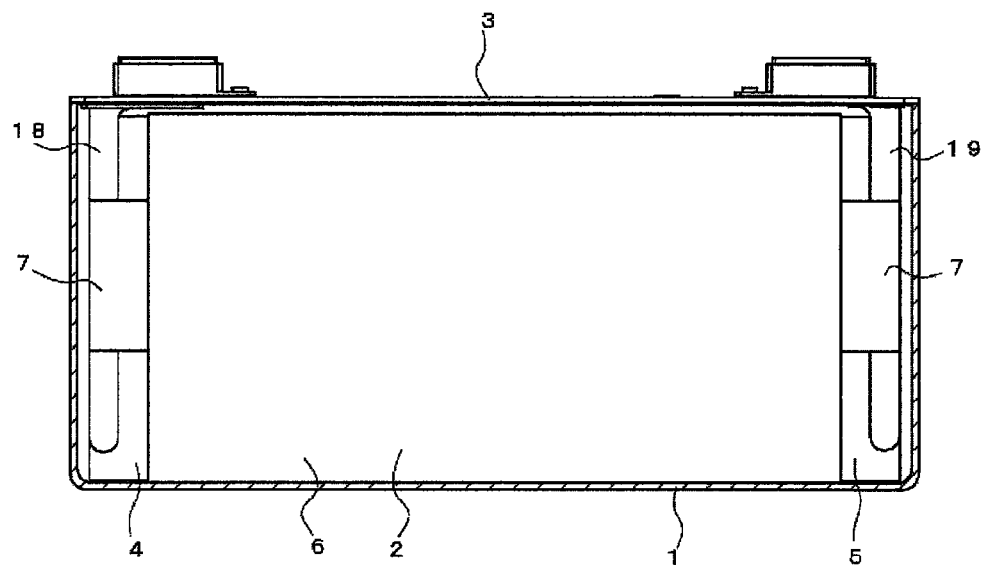
FIG. 2 is a front sectional view of the battery according to the embodiment.
Figure 3:
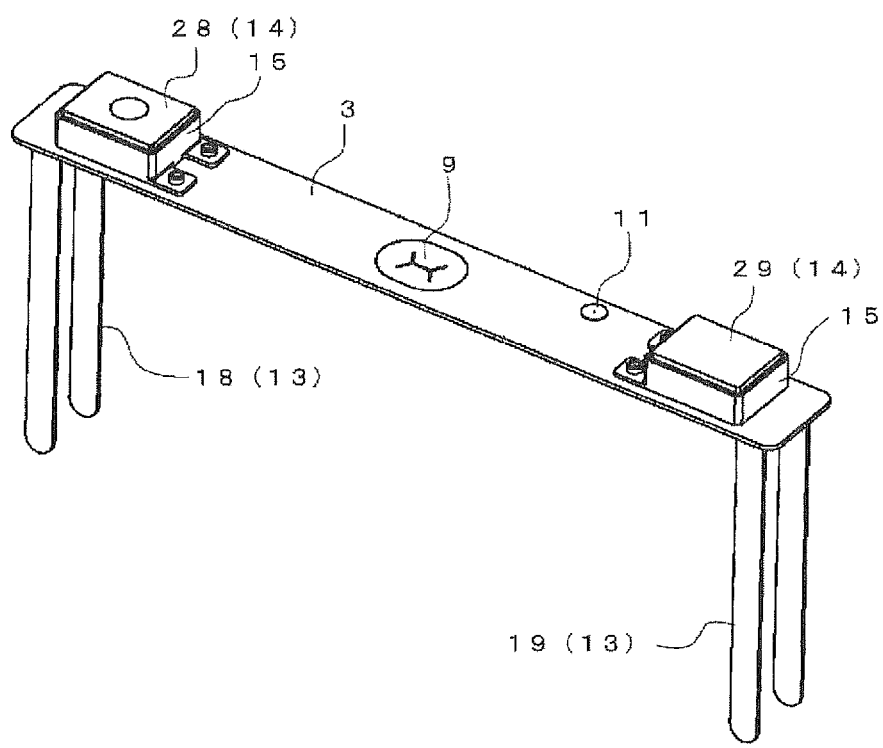
FIG. 3 is a perspective view of a lid body in FIG. 1 and seen from above.
Figure 4:
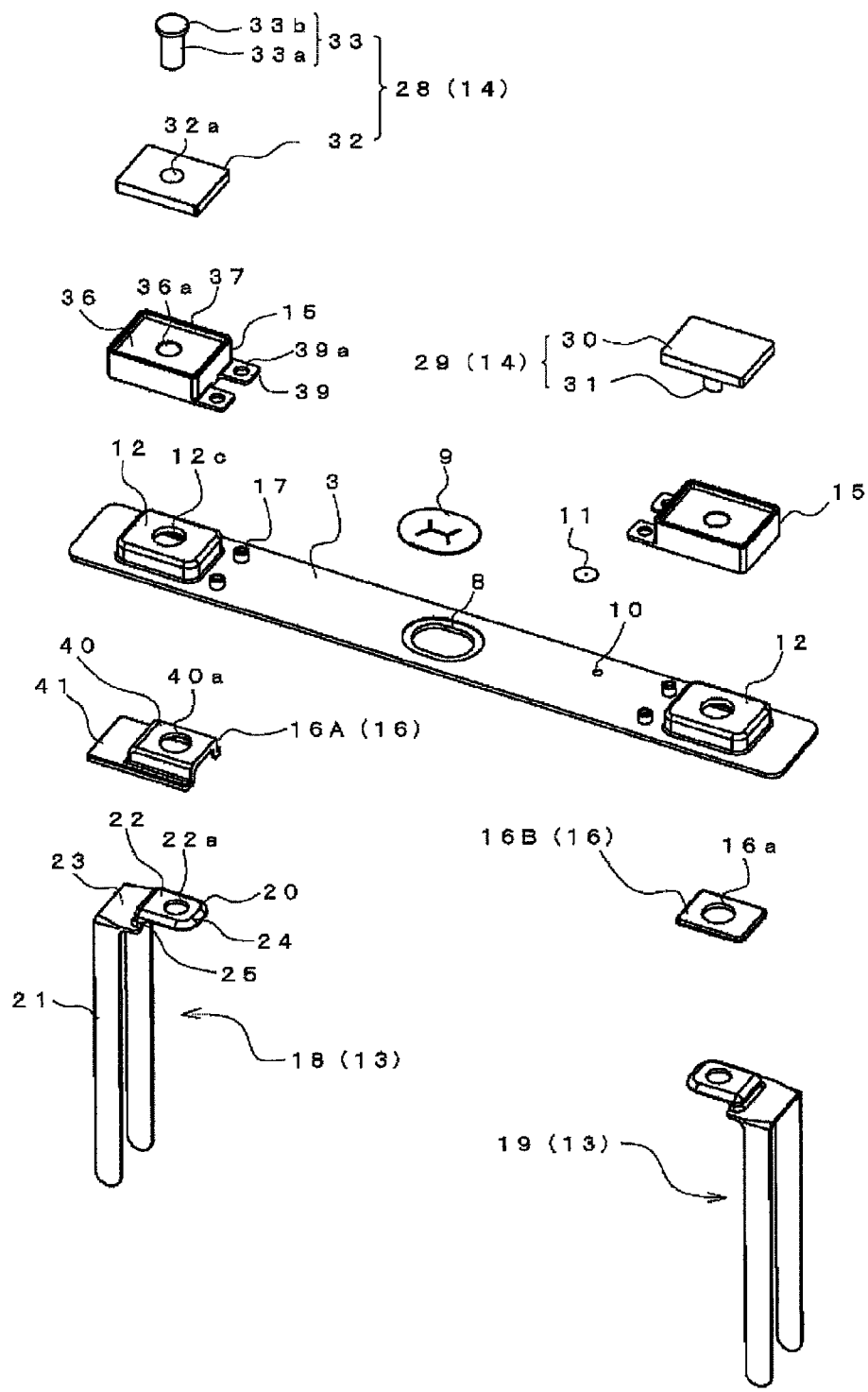
FIG. 4 is an exploded perspective view of FIG. 3.
Figure 5:
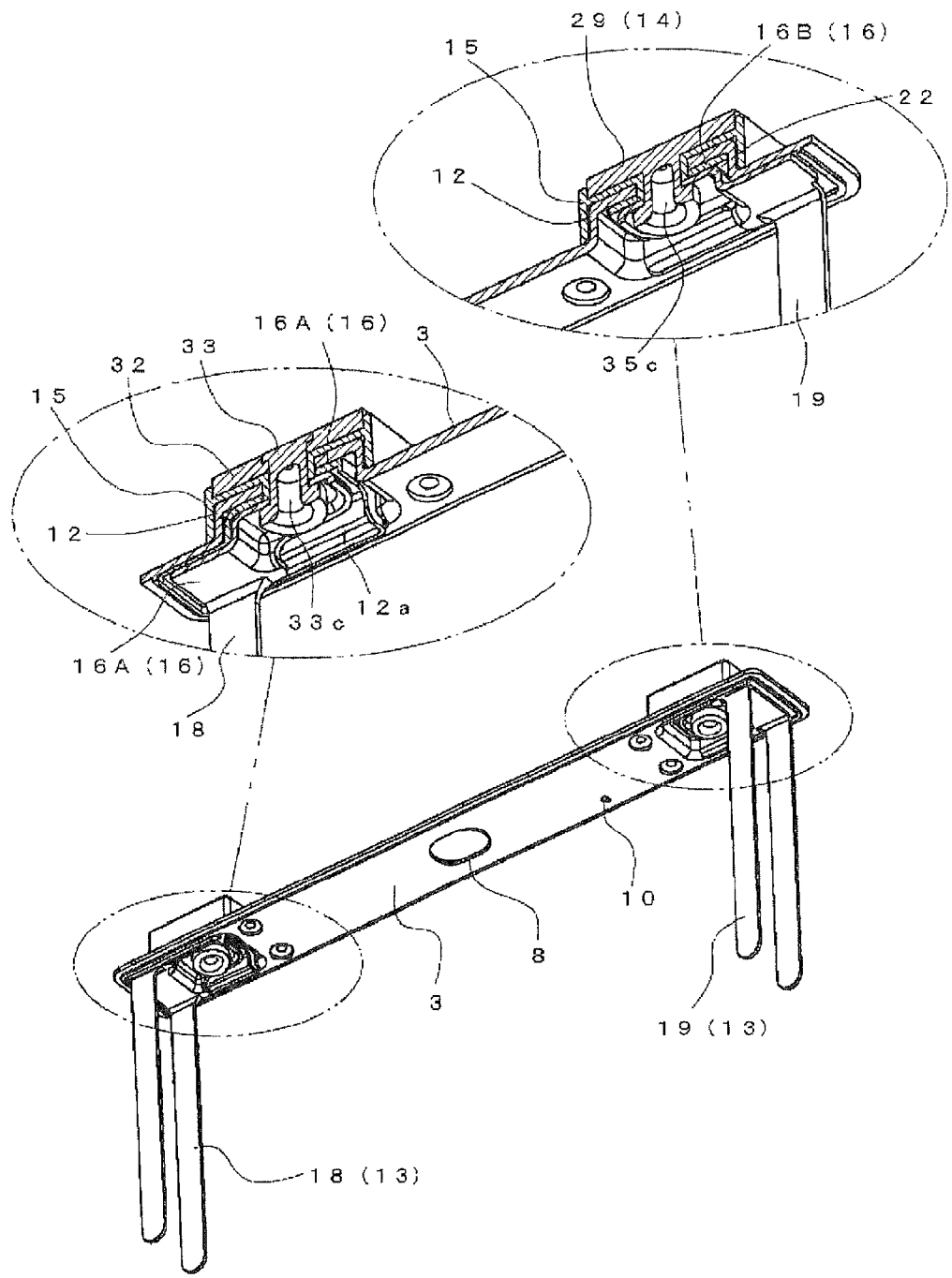
FIG. 5 is a perspective view of the lid body in FIG. 1 and seen from below with partial enlarged sectional views of the lid body.
Figure 6:
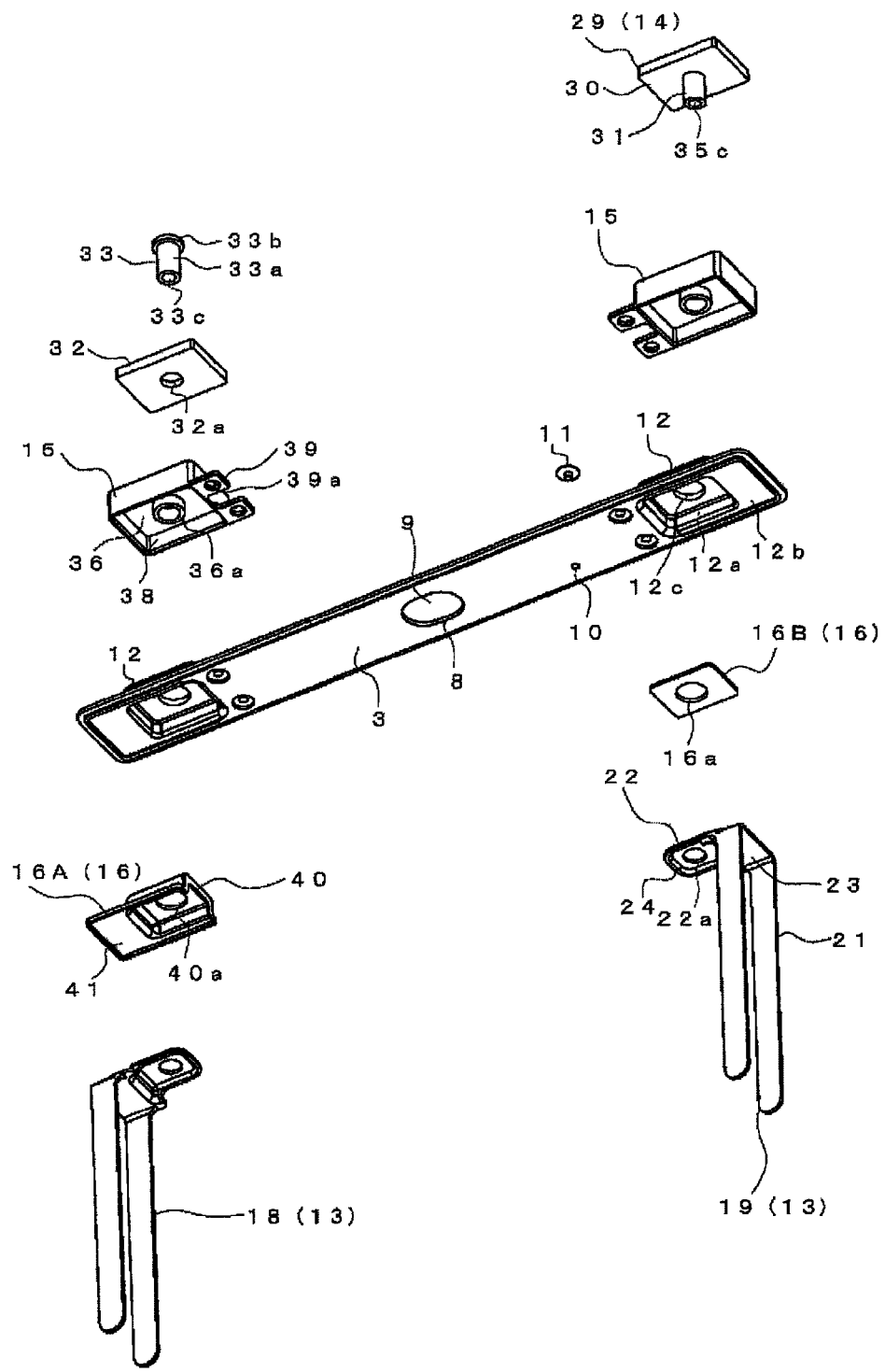
FIG. 6 is an exploded perspective view of FIG. 5.

FIG. 1 shows a nonaqueous electrolyte secondary battery which is an example of the electric storage device. As shown in FIG. 2, the nonaqueous electrolyte secondary battery is formed by housing an electrode assembly 2 in a battery case 1 and sealing the battery case 1 with a lid body 3. Here, the battery case 1 and the lid body 3 form an outer covering.

The battery case 1 is in a shape of an open-topped rectangular parallelepiped and made of aluminum, an aluminum alloy, or the like.

Although details of the electrode assembly 2 are not shown in the drawings, the electrode assembly 2 is formed by disposing separators 6 formed by porous resin films between a negative electrode 4 made of copper foil and a positive electrode 5 made of aluminum foil, similarly to the conventional type. These are in shapes of bands and wound into a flat shape so that they can be housed in the battery case 1 while the negative electrode 4 and the positive electrode 5 are displaced in opposite directions in a width direction with respect to the separators 6. In this way, the electrode assembly 2 has flat face portions 2a disposed between opposite side faces facing each other of the battery case 1 and curved portions 2b positioned on a bottom face side and on a side of the lid body 3 of the battery case 1 and having arc-shaped sections. As will be described later, a negative electrode current collector 18 is connected to the negative electrode 4 of the electrode assembly 2 with a clip 7 interposed therebetween and a positive electrode current collector 19 is connected to the positive electrode 5 with a clip 7 interposed therebetween.

As shown in FIGS. 3 to 6, the lid body 3 is a long rectangular metal plate in a plan view, a substantially oval opening portion 8 which is stepped from an upper face side is formed in a central portion of the lid body 3, and a metal safety valve 9 is attached to the opening portion 8. A substantially H-shaped thin-walled portion is formed at the safety valve 9 so that the thin-walled portion is torn, when internal pressure abnormally increases, to thereby reduce the pressure.

Figure 9:
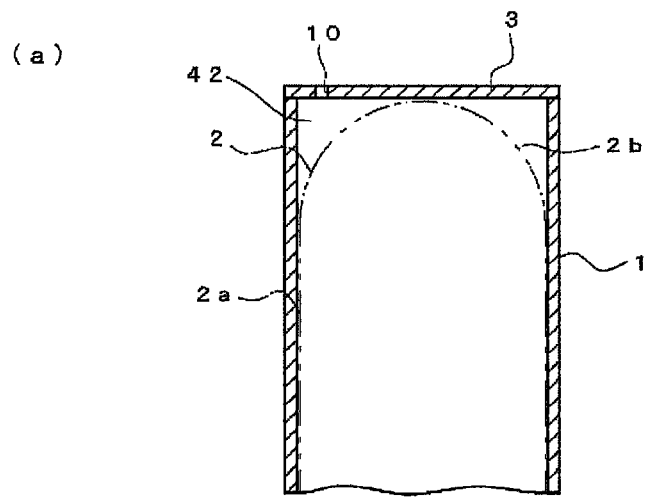
FIG. 9(a) is a cross-sectional view at an electrolyte solution filling opening portion in FIG. 1
FIG. 9(b) is a vertical sectional perspective view at the electrolyte solution filling opening portion in FIG. 1.
Figure 9:
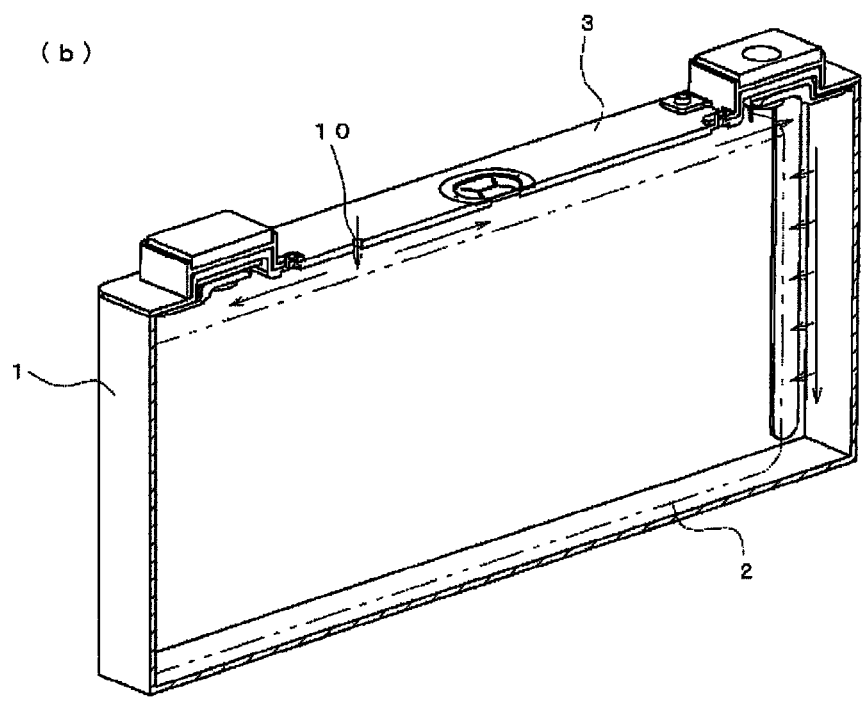

A small-diameter electrolyte solution filling opening 10 is formed on one end side of the lid body 3 and is closed with a plug body 11 after filling of the electrolyte solution. The electrolyte solution filling opening 10 is not formed on a longitudinal center line but formed in a position displaced toward a side edge. In other words, the electrolyte solution filling opening 10 opens in a position displaced sideways from a position where the curved portion 2b of the electrode assembly 2 protrudes the most as shown in FIG. 9(a). That is, the electrode assembly 2 is housed, so that the electrolyte solution filling opening 10 opens to a space portion (dead space) 42 formed between the curved portion 2b, the battery case 1, and the lid body 3. In this case, a minimum distance between the electrolyte solution filling opening 10 and the electrode assembly 2 is preferably not shorter than 0.5 mm. If the distance is shorter than 0.5 mm, filling operation of the electrolyte solution may not be carried out smoothly.

Then, if the electrolyte solution is filled through the electrolyte solution filling opening 10 after vacuuming the inside of the outer covering, as shown with arrows in FIG. 9(b), the electrolyte solution flows in the longitudinal direction along the lid body 3 through the space portion 42, flows to the bottom face side along end faces of the battery case 1, and then enters between respective parts of the electrode assembly 2. In this manner, because the filled electrolyte solution flows smoothly, it is possible to shorten a time required to fill the electrolyte solution to thereby achieve the efficient electrolyte solution filling operation. Moreover, it is possible to suppress flow resistance received by the filled electrolyte solution to thereby sufficiently fill the electrolyte solution into the electrode assembly 2 and sufficiently increase energy density of the battery.

In welding the plug body 11 to the electrolyte solution filling opening 10 after the filling of the electrolyte solution, if the position of the electrolyte solution filling opening 10 is close to the electrode assembly 2, the electrode assembly 2 may be affected by heat. For example, the separators 6 of the electrode assembly 2 may melt to cause a short circuit between the positive and negative electrodes. In the embodiment, the plug body 11 is welded at the position away from the electrode assembly 2 and therefore the electrode assembly 2 is less affected by the heat and the short circuit is less liable to occur.

A position of the curved portion 2b of the electrode assembly 2 housed in the battery case 1 which protrudes the most toward the lid body 3 is in contact with the lid body 3 or in a vicinity of the lid body 3. The contact states include not only a line contact of the curved portion 2b with the lid body 3 but also a surface contact of the deformed curved portion 2b with the lid body 3. The vicinity includes such an area that a flow rate of the filled electrolyte solution is lower than that in the position shown in FIG. 9(a) when the electrolyte solution filling opening 10 is positioned on the longitudinal center line of the lid body 3.

Engagement receiving portions 12 in substantially rectangular shapes in a plan view and bulging upward are formed respectively on upper faces of opposite end portions of the lid body 3 and a relatively shallow guide recessed portion 12b is formed around a periphery (except one side) of an engagement recessed portion 12a on a lower face side of each of the engagement receiving portions 12. By forming the engagement receiving portion 12, a lower gasket 16 and a connection receiving portion 20 of the current collector 13 (described later) can be disposed in the engagement recessed portion 12a on the lower face side. Therefore, as described above, the electrode assembly 2 can be disposed close to the lid body 3. In other words, while allowing only the engagement receiving portions 12 to protrude outside from the lid body 3, it is possible to make best use of an inner space to secure a large occupied volume for the electrode assembly 2 to be housed to thereby sufficiently increase the energy density. Moreover, a through hole 12c is formed in a central portion of a ceiling face forming each of the engagement recessed portions 12a. Into the engagement receiving portion 12 and the guide recessed portion 12b, the current collector 13 and the external terminal 14 are attached with an upper gasket 15 and the lower gasket 16 interposed therebetween, respectively.

Locking protruding portions 17 protruding upward from two positions in the width direction are formed in a vicinity on an inner side of each of the engagement receiving portions 12 of the lid body 3. Each of the locking protruding portions 17 is in a cylindrical shape with a bottom and formed simultaneously with pressing of the lid body 3. The upper gasket 15 (described later) is locked to the respective locking protruding portions 17, which achieves positioning of the upper gasket 15 in a rotating direction.

The current collectors 13 include the copper negative electrode current collector 18 and the aluminum positive electrode current collector 19. Each of the current collectors 13 is formed by pressing a long metal plate material to have the connection receiving portion 20 and leg portions 21 respectively extending from opposite side portions of the connection receiving portion 20. The connection receiving portion 20 is formed by a fitted portion 22 to be disposed in the engagement recessed portion 12a of the engagement receiving portion 12 of the lid body 3 and a base portion 23 continuous from the fitted portion 22. The fitted portion 22 is a flat face, a through hole 22a is formed in a central portion of the fitted portion 22, and a guide edge portion 24 extending in an orthogonal direction to the flat face is formed at a peripheral edge of the fitted portion 22 except one side continuous with the base portion 23. On the side of the base portion 23, a continuous portion 25 extending farther than the guide edge portion 24 is formed to reach the base portion 23. Such guide edge portion 24 and continuous portion 25 sufficiently increase rigidity of the connection receiving portion 20 of the current collector 13.

The leg portions 21 extend from opposite side edge portions of the base portion 23 in an orthogonal direction to the base portion 23 and are disposed along the opposite side faces of the electrode assembly 2. Each of the leg portions 21 is connected to the positive electrode 5 or the negative electrode 4 of the electrode assembly 2 with the clip 7 interposed therebetween and the clip 7 is pinched between opposed inner faces of the battery case 1 to thereby prevent positional displacement.

The external terminals 14 include a negative electrode external terminal 28 and a positive electrode external terminal 29 and each of the external terminals 14 is formed by a flat plate portion 30 and a shaft portion 31 extending downward from a central portion of a lower face of the flat plate portion 30. A bus bar (not shown) is connected by welding to a front face (exposed face) of the flat plate portion 30.

Figure 7:
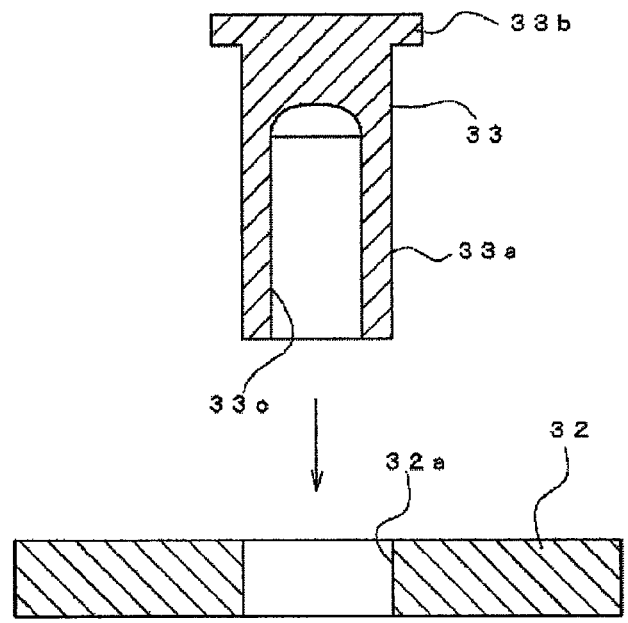
FIGS. 7(a) and 7(b) are sectional views showing manufacturing steps of a negative electrode external terminal in FIG. 4.
Figure 7:
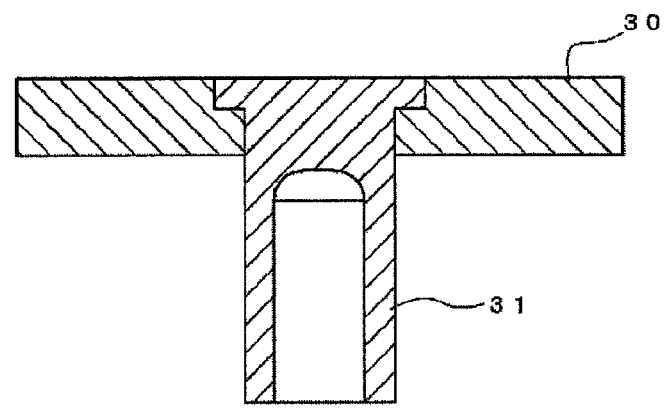
Figure 8:
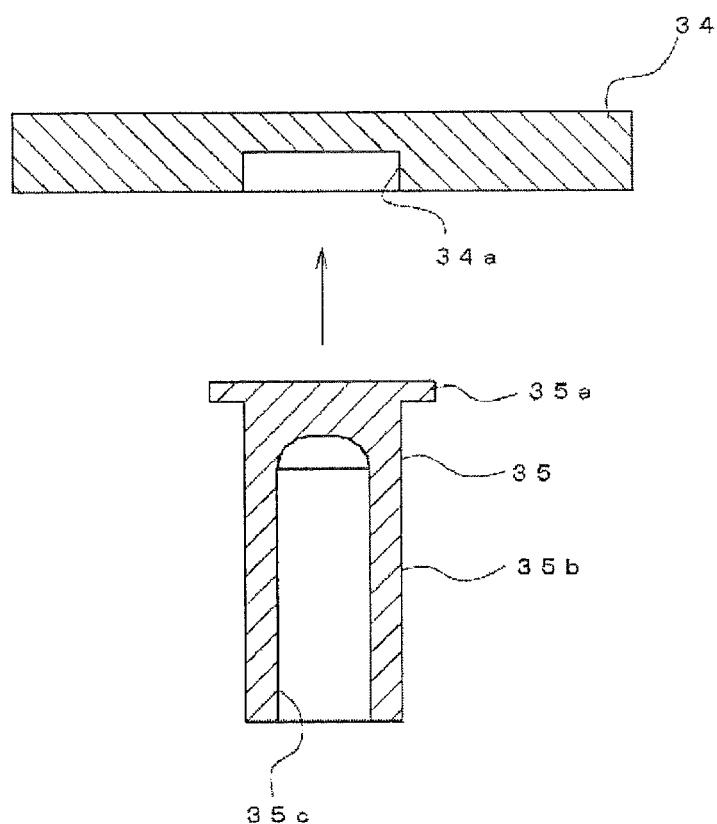
FIGS. 8(a) and 8(b) are sectional views showing other manufacturing steps of the negative electrode external terminal in FIG. 4.
Figure 8:
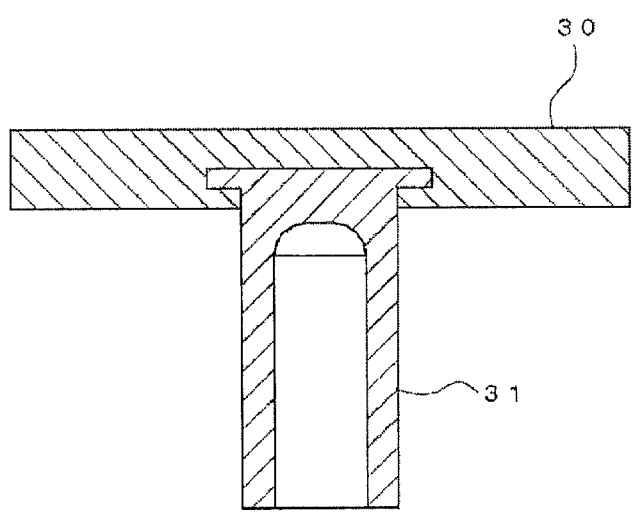

As shown in FIGS. 7(a) and 7(b), the negative electrode external terminal 28 may be formed by a rectangular aluminum plate-shaped body 32 in a plan view and a copper rivet 33. In other words, a shaft portion 33a of the rivet 33 is inserted through a through hole 32a formed in a central portion of the plate-shaped body 32 and a flange portion 33b is fitted into the through hole 32a by pressing. An inner diameter of the through hole 32a of the plate-shaped body 32 is only slightly larger than an outer diameter of the shaft portion 33a of the rivet 33 and sufficiently smaller than an outer diameter of the flange portion 33b. Therefore, by press-fitting, the flange portion 33b spreads the through hole 32a and is pressure-bonded to the through hole 32a, the spread portion is pressure-bonded to the shaft portion 33a, and the rivet 33 and the plate-shaped body 32 become integrated with each other. Moreover, a circular recessed portion 33c is formed in a central portion of a tip end face of the shaft portion 33a of the rivet 33. As will be described later, after inserting the shaft portion 33a through the respective through holes in the upper gasket 15, the engagement receiving portion 12 of the lid body 3, the lower gasket 16, and the negative electrode current collector 18, the recessed portion 33c is spread while pinching them to thereby swage the rivet 33.

On the other hand, the entire positive electrode external terminal 29 is made of aluminum, in which a flat plate portion 30 and a shaft portion 31 are formed integrally.

The upper gasket 15 is made of synthetic resin and is formed by partitioning a rectangular frame body in a plan view with a partition 36 into an upper terminal retaining recessed portion 37 and a lower attaching recessed portion 38 and forming a tongue piece 39 extending further sideways from one side forming a lower opening edge portion of the frame body. A cylindrical portion 36a extending downward from a ceiling face is formed at a central portion of the partition 36. The cylindrical portion 36a is inserted through the through hole 12c in the engagement receiving portion 12 and fitted in a through hole 40a in the lower gasket 16. Locking holes 39a are formed at two positions of the tongue piece 39 and the locking protruding portions 17 of the lid body 3 are inserted through the locking holes 39a. The upper gasket 15 is shaped along the engagement receiving portion 12 of the lid body 3 formed in the rectangular shape in the plan view and positional displacement in a rotating direction is prevented by only placing the upper gasket 15 on the engagement receiving portion 12. Moreover, by inserting the locking protruding portions 17 through the locking holes 39a, the displacement in the rotating direction is prevented reliably.

The lower gasket 16 is a rectangular plate in a plan view having a through hole 16a formed in a central portion and made of synthetic resin. The lower gaskets 16 on the negative electrode side and the positive electrode side are slightly different from each other in shape.

The negative electrode side lower gasket 16A is formed by a bulging portion 40 disposed in the engagement recessed portion 12a formed in the engagement receiving portion 12 of the lid body 3 and a flat portion 41 continuous with the bulging portion 40. The bulging portion 40 is shaped along an inner face of the engagement recessed portion 12a of the engagement receiving portion 12 except one side and the through hole 40a is formed in the central portion. The flat portion 41 is disposed in the guide recessed portion 12b of the engagement receiving portion 12. The negative electrode side lower gasket 16A is disposed in the engagement recessed portion 12a forming the engagement receiving portion 12 of the lid body 3 from below and pinched between the lid body 3 and the negative electrode external terminal 28. In this pinched state, the negative electrode side lower gasket 16A provides insulation between the negative electrode external terminal 28 and the lid body 3 and also seals the through hole 12c formed in the engagement receiving portion 12 of the lid body 3 together with the upper gasket 15.

On the other hand, the positive electrode side lower gasket 16B is in a flat plate shape having a through hole 16a formed in a central portion and is disposed in the engagement recessed portion 12a forming the engagement receiving portion 12. The positive electrode side lower gasket 16B seals the through hole 12c formed in the engagement receiving portion 12 of the lid body 3 together with the upper gasket 15.

The invention is not restricted to the structures described in the above-described embodiment and can be changed in various ways.

Figure 10:
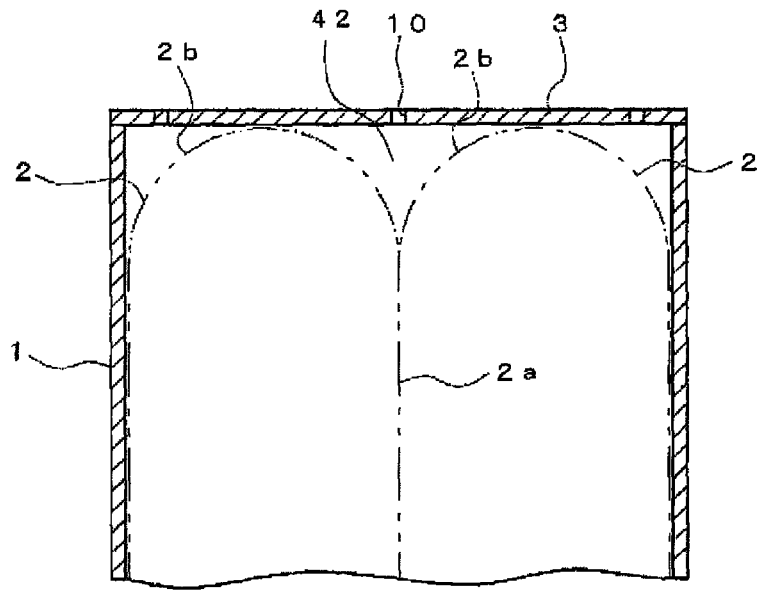
FIG. 10 is a cross-sectional view at an electrolyte solution filling opening portion according to another embodiment.
Figure 11:
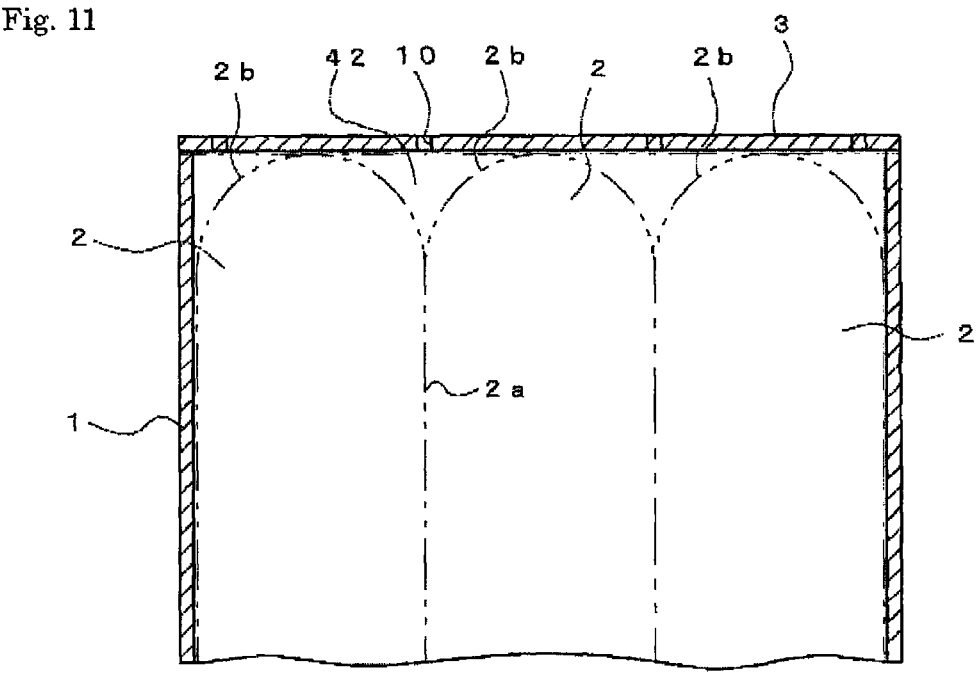
FIG. 11 is a cross-sectional view at an electrolyte solution filling opening portion according to another embodiment.

Although only one electrode assembly 2 is housed in the outer covering in the above-described embodiment, two electrode assemblies 2 may be housed as shown in FIG. 10. In this case, space portions (dead spaces) 42 formed by the upper curved portions 2b of the electrode assemblies 2 are formed not only in opposite side portions but also in a central position and therefore the electrolyte solution filling opening 10 can be formed on the longitudinal center line of the lid body 3. Furthermore, three electrode assemblies 2 may be disposed as shown in FIG. 11 or four or more electrode assemblies 2 may be housed. The electrolyte solution filling opening 10 may be formed to open to any of the formed space portions. The electrolyte solution filling opening 10 may be formed in one position or the electrolyte solution filling openings 10 may be formed in two or more positions. For example, in the case of a large battery, if the electrolyte solution filling openings 10 are formed in two or more positions, a large amount of electrolyte solution can be filled at once, which increases electrolyte solution filling efficiency.

Although the electrolyte solution filling opening 10 is formed in the lid body 3 as the electrolyte solution filling portion in the above-described embodiment, a notch may be formed at an edge portion instead. The shape of the electrolyte solution filling portion can be designed freely depending on the situation (e.g., a shape of a tip end of an electrolyte solution filling nozzle).

Figure 12:
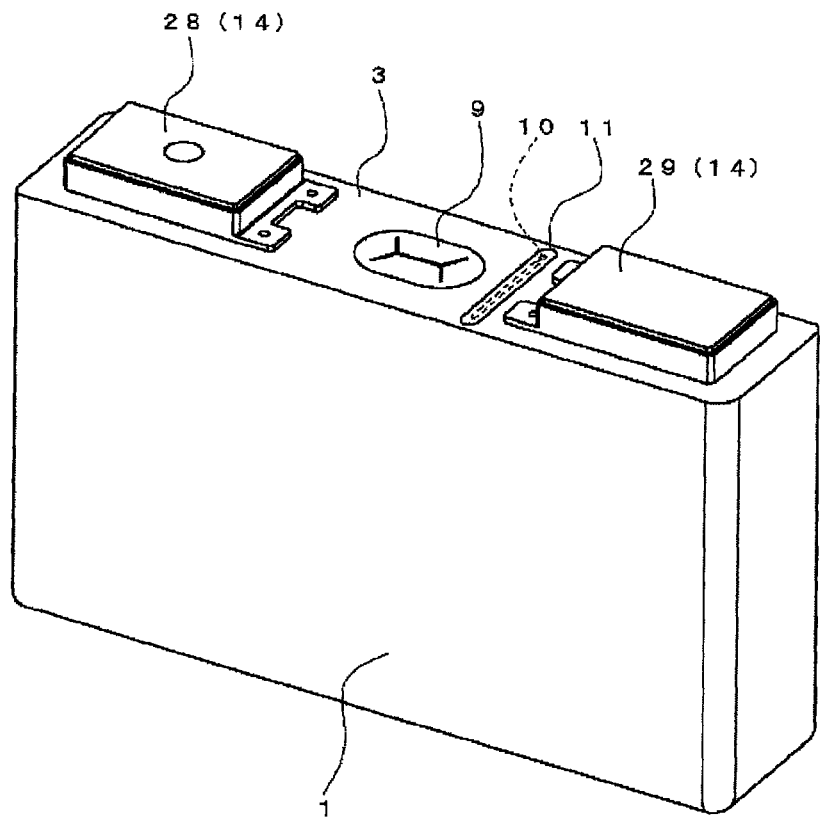
FIG. 12 is a perspective view showing an example of an electrolyte solution filling portion according to another embodiment.
Figure 13:
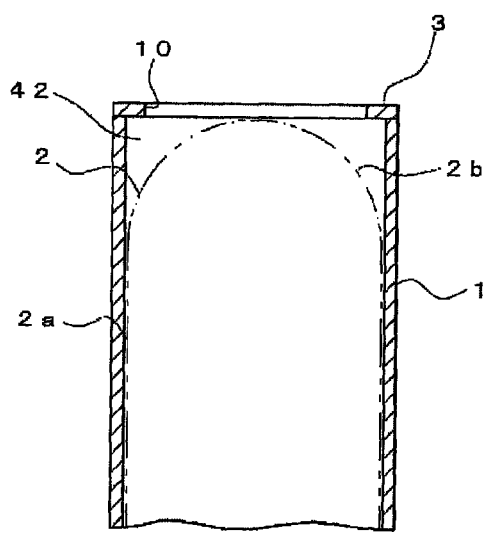
FIG. 13 is a cross-sectional view at the electrolyte solution fitting opening portion in FIG. 12.
Figure 14:
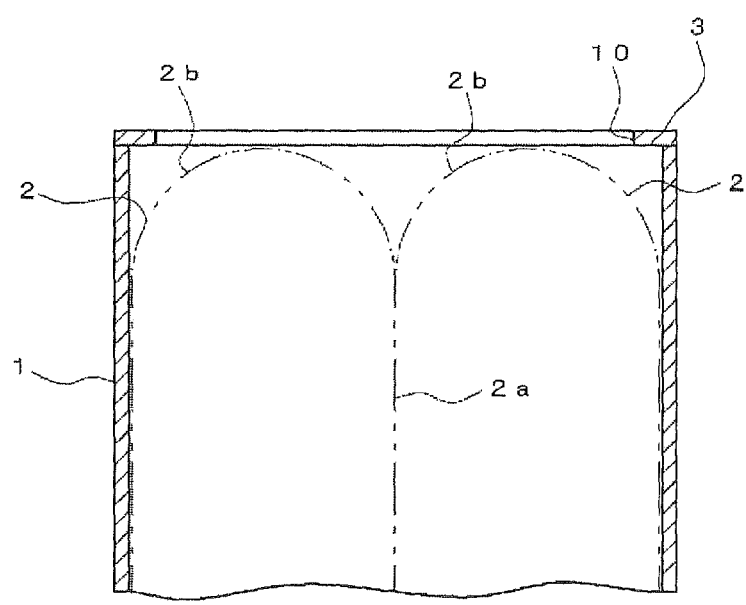
FIG. 14 is a cross-sectional view at the electrolyte solution filling opening portion according to another embodiment of FIG. 13.

Although the electrolyte solution filling opening 10 which is the circular opening has been described as an example of the electrolyte solution filling portion in the above-described embodiment, the electrolyte solution filling portion may be a slit-shaped opening as shown in FIG. 12. In this case, the plug body 11 is in a long shape according to the slit shape. With regard to the electrode assembly 2 housed inside, the one electrode assembly 2 may be housed as shown in FIG. 13, two electrode assemblies 2 may be housed as shown in FIG. 14, or even more electrode assemblies 2 may be housed. In this regard, irrespective of the number of housed electrode assemblies 2, the electrolyte solution filling opening 10 may be formed in the same slit shape. Then, the electrolyte solution may be filled into suitable one of spaces formed inside between the lid body 3 and the electrode assemblies 2.

Industrial Applicability

The structure of the lid body 3 of the electric storage device according to the invention can be applied to various batteries such as lead-acid batteries as well as lithium-ion batteries.

DESCRIPTION OF REFERENCE SIGNS

1 . . . Battery case (outer covering)
2 . . . Electrode assembly
3 . . . Lid body (outer covering)
4 . . . Negative electrode
5 . . . Positive electrode
6 . . . Separator
7 . . . Clip
8 . . . Opening portion
9 . . . Safety valve
10 . . . Electrolyte solution filling opening (electrolyte solution filling portion)
11 . . . Plug body
12 . . . Engagement receiving portion
12a . . . Engagement recessed portion
12b . . . Guide recessed portion
12c . . . Through hole
13 . . . Current collector
14 . . . External terminal
15 . . . Upper gasket
16 . . . Lower gasket
16a . . . Through hole
16A . . . Negative electrode side lower gasket
16B . . . Positive electrode side lower gasket
17 . . . Locking protruding portion
18 . . . Negative electrode current collector
19 . . . Positive electrode current collector
20 . . . Connection receiving portion
21 . . . Leg portion
22 . . . Fitted portion
22a . . . Through hole
23 . . . Base portion
24 . . . Guide edge portion
25 . . . Continuous portion
28 . . . Negative electrode external terminal
29 . . . Positive electrode external terminal
30 . . . Flat plate portion
31 . . . Shaft portion
32 . . . Plate-shaped body
32a . . . Through hole
33 . . . Rivet
33a . . . Shaft portion
33b . . . Flange portion
34 . . . Plate-shaped body
34a . . . Recessed portion
35 . . . Rivet
35a . . . Flange portion
35b . . . Shaft portion
36 . . . Partition
36a . . . Through hole
37 . . . Terminal retaining recessed portion
38 . . . Attaching recessed portion
39 . . . Tongue piece 39a . . . Locking hole
40 . . . Bulging portion
41 . . . Flat portion
42 . . . Space portion

The invention claimed is:

1. An electric storage device, comprising:
an outer covering;
an external terminal having an exposed face exposed outside from the outer covering;
a current collector disposed inside the outer covering and connected to the external terminal; and
an electrode assembly disposed inside the outer covering and connected to the current collector,
wherein the outer covering is substantially in a shape of a rectangular parallelepiped and formed by a lid body forming one face of the outer covering and an electric storage device case forming other faces of the outer covering,
wherein the electrode assembly is formed by winding sheet-shaped positive electrode and negative electrode into a flat shape with a separator interposed therebetween and housed in the electric storage device case so that curved portions obtained by the winding are positioned on a lid body side and a bottom face side;
wherein the lid body includes an electrolyte solution filling portion that opens to a clearance formed between one of the curved portions of the electrode assembly and the outer covering,
wherein the electrolyte filling opening is entirely formed outside of a longitudinal centerline of the lid body and opens in a position displaced sideways from a position where said one of the curved portions of the electrode assembly protruded most, and
wherein a single electrode assembly including the electrode assembly is housed in the electric storage device case.

2. The electric storage device according to claim 1, wherein a position of said one of the curved portions of the electrode assembly, which protrudes the most toward the lid body, is in contact with the lid body or in a vicinity of the lid body.

3. The electric storage device according to claim 1, wherein the electrolyte solution filling portion of the lid body is formed to open to the clearance formed between said one of the curved portions of the electrode assembly and the outer covering.

4. The electric storage device according to claim 1, wherein the lid body is disposed close to the electrode assembly and an area of the lid body where the exposed face of the external terminal is disposed is formed by an engagement receiving portion bulging away from the electrode assembly.

5. The electric storage device according to claim 1, wherein the current collector includes a connection receiving portion and a leg portion extending from the connection receiving portion, and
wherein the connection receiving portion of the current collector is configured to be disposed in the engagement receiving portion of the lid body.

6. The electric storage device according to claim 5, wherein a gasket is configured to be disposed between the engagement receiving portion of the lid body and the connection receiving portion of the current collector.

7. The electric storage device according to claim 1, wherein the electrolyte solution filling portion is closed by welding a plug body to the electrolyte solution filling portion.

8. The electric storage device according to claim 1, wherein a minimum distance between the electrolyte solution filling portion and the electrode assembly is not shorter than 0.5 mm.

9. The electric storage device according to claim 1, wherein said one of the curved portions of the electrode assembly includes a slope portion such that the electrolyte solution is configured to hit the slope portion and to flow along the slope portion.

10. The electric storage device according to claim 1, wherein said one of the curved portions protrudes the most toward the lid body.

11. The electric storage device according to claim 1, wherein said one of the curved portions is in a surface contact with the lid body.

12. The electric storage device according to claim 1, wherein the electrode assembly includes:
flat face portions disposed between opposite side faces of the electric storage device case; and
the curved portions positioned on the bottom face side and on the lid body side of the electric storage case and including arc-shaped sections.

13. The electric storage device according to claim 12, wherein said one of the curved portions extends from each of the opposite side faces of the electric storage device case and forms one of the arc-shaped sections that faces the lid body side of the electric storage case.

14. An electric storage device, comprising:
an outer covering;
an external terminal including an exposed face exposed outside from the outer covering;
a current collector disposed inside the outer covering and connected to the external terminal; and
an electrode assembly disposed inside the outer covering and connected to the current collector,
wherein the outer covering includes a lid body forming one face of the outer covering and an electric storage device case forming other faces of the outer covering,
wherein the electrode assembly is housed in the electric storage device case and includes a curved portion positioned on a lid body side of the electric storage device,
wherein the lid body includes an electrolyte solution filling portion that opens to a clearance formed between the curved portion of the electrode assembly and the outer covering,
wherein the electrolyte filling opening is entirely formed outside of a longitudinal centerline of the lid body and opens in a position displaced sideways from a position where the curved portion of the electrode assembly protruded most, and
wherein only one electrode assembly consisting of the electrode assembly is housed in the electric storage device case.

15. The electric storage device according to claim 14, wherein the curved portion of the electrode assembly includes a slope portion such that the electrolyte solution is configured to hit the slope portion and to flow along the slope portion.

16. The electric storage device according to claim 14, wherein the curved portion is in a surface contact with the lid body.

17. The electric storage device according to claim 1, wherein the electrode assembly includes:
flat face portions disposed between opposite side faces of the electric storage device case; and
the curved portion positioned on the lid body side of the electric storage case and including an arc-shaped section.

18. The electric storage device according to claim 17, wherein the curved portion extends from each of the opposite side faces of the electric storage device case and forms the arc-shaped section that faces the lid body side of the electric storage case.

* * * * *